(12) United States Patent
Reyes et al.

(10) Patent No.: US 7,582,248 B2
(45) Date of Patent: Sep. 1, 2009

(54) APPARATUS AND METHOD FOR MANUFACTURING A MULTIPLE MATERIAL GOLF CLUB HEAD

(75) Inventors: Herbert Reyes, Laguna Niguel, CA (US); Robert S. Gonczi, Oceanside, CA (US); Craig E. Abbott, Vista, CA (US); James D. Marinez, San Marcos, CA (US)

(73) Assignee: Callaway Golf Company, Carlsbad, CA (US)

( * ) Notice: Subject to any disclaimer, the term of this patent is extended or adjusted under 35 U.S.C. 154(b) by 515 days.

(21) Appl. No.: 11/278,198

(22) Filed: Mar. 31, 2006

(65) Prior Publication Data

US 2006/0220279 A1    Oct. 5, 2006

Related U.S. Application Data

(60) Provisional application No. 60/667,374, filed on Mar. 31, 2005.

(51) Int. Cl.
B32B 9/00    (2006.01)
(52) U.S. Cl. .................. 264/510; 473/324; 156/156
(58) Field of Classification Search ................. 264/510, 264/523, 907; 156/156; 425/460; D21/793
See application file for complete search history.

(56) References Cited

U.S. PATENT DOCUMENTS

| | | |
|---|---|---|
| 1,658,581 A | 2/1928 | Tobia |
| 4,469,655 A | 9/1984 | Kiss |
| 4,496,153 A | 1/1985 | Kochevar |
| 4,502,687 A | 3/1985 | Kochevar |
| 4,575,447 A | 3/1986 | Hariguchi |
| 4,667,963 A | 5/1987 | Yoneyama |
| 4,778,722 A | 10/1988 | Yamamura et al. |
| 4,779,387 A | 10/1988 | Reid et al. |
| 4,793,616 A | 12/1988 | Fernandez |
| 4,874,171 A | 10/1989 | Ezaki et al. |
| 5,009,425 A | 4/1991 | Okumoto et al. |
| 5,190,290 A | 3/1993 | Take |
| 5,213,329 A | 5/1993 | Okumoto |
| 5,228,694 A | 7/1993 | Okumoto |
| 5,242,168 A | 9/1993 | Aizawa |
| 5,262,118 A | 11/1993 | Fukushima et al. |
| 5,318,296 A | 6/1994 | Adams et al. |
| 5,350,556 A | 9/1994 | Abe et al. |
| 5,377,986 A | 1/1995 | Viollaz et al. |
| 5,378,295 A | 1/1995 | Yamashita et al. |
| 5,429,365 A | 7/1995 | McKeighon |
| 5,485,998 A | 1/1996 | Kobayashi |
| 5,489,098 A | 2/1996 | Gojny et al. |
| 5,533,728 A | 7/1996 | Pehoski |
| 5,547,427 A | 8/1996 | Rigal et al. |
| 5,593,356 A | 1/1997 | Takeda |
| 5,672,120 A | 9/1997 | Ramirez |
| 5,674,133 A | 10/1997 | Chang |
| 5,779,560 A | 7/1998 | Buck |
| 5,985,197 A * | 11/1999 | Nelson et al. ............... 264/221 |

(Continued)

*Primary Examiner*—Kahnh Nguyen
*Assistant Examiner*—Saeed M Huda
(74) *Attorney, Agent, or Firm*—Michael A. Catania; Elaine H. Lo

(57) ABSTRACT

A method and apparatus for co-curing a multiple material golf club head is disclosed herein. The club head preferably is composed of a metal face component and an aft-body composed of a plurality of plies of pre-preg material.

2 Claims, 18 Drawing Sheets

U.S. PATENT DOCUMENTS

| | | |
|---|---|---|
| 5,989,134 A | 11/1999 | Antonious |
| 6,165,081 A | 12/2000 | Chou |
| 6,440,008 B2 * | 8/2002 | Murphy et al. ............... 473/324 |
| 6,565,452 B2 * | 5/2003 | Helmstetter et al. ......... 473/342 |
| 6,695,608 B2 | 2/2004 | Murphy et al. |

* cited by examiner

APPARATUS AND METHOD FOR MANUFACTURING A MULTIPLE MATERIAL GOLF CLUB HEAD

CROSS REFERENCES TO RELATED APPLICATIONS

This application claims priority to U.S. Provisional Application No. 60/667,374, filed on Mar. 31, 2005.

STATEMENT REGARDING FEDERALLY SPONSORED RESEARCH OR DEVELOPMENT

Not Applicable

BACKGROUND OF THE INVENTION

1. Field of the Invention

The present invention relates to an apparatus and manufacturing method for a multiple material golf club head. More specifically, the present invention relates to an apparatus and manufacturing method for co-molding a multiple material golf club head.

2. Description of the Related Art

One of the first (if not the first) disclosures of a golf club head composed of a plurality of plies of a pre-preg material is Great Britain Patent Application Number 1201648 which was filed in 1967 on behalf of William Charles Carlton.

In 1984, U.S. Pat. No. 4,449,707 issued to Hayashi et al., for a Golf Club Head Of Carbon Fiber Reinforced Plastic, based on a Japanese Patent Application originally filed in 1982. The Hayashi Patent discloses surrounding a core with a fiber reinforced fabric to create a golf club head with a proper center of gravity.

Another disclosure is U.S. Pat. No. 4,545,580 to Tomita et al., for a Wood-Type Golf Club Head, based on a Japanese Patent Application originally filed in 1983. The Tomita Patent discloses a durable golf club head having an outer shell composed of a fiber reinforced plastic material, a foam center core, and an intermediate shell formed of a thermoplastic resin material.

Yet another disclosure is U.S. Pat. No. 4,630,826 to Nishigaki et al., for Golf Club Head. The Nishigaki Patent discloses body composed of a carbon resin layer and a cast resin layer with a face insert block composed of a ceramic material.

Still another disclosure is U.S. Pat. No. 4,778,185 to Kurokawa, for Wood-Type Core-Shell Golf Club Heads, based on a Japanese Patent Application originally filed in 1984. The Kurokawa Patent discloses a golf club head composed of a foam core and a shell composed of a material fiber reinforced plastic having long and short fibers.

Yet another disclosure is U.S. Pat. No. 4,793,616 to Fernandez, for Golf Club. The Fernandez Patent discloses a club head shell composed resin impregnated fibers and ceramic particles within the resin to provide a high strength shell.

Yet another disclosure is U.S. Pat. No. 5,154,425 to Niskanen et al., for a Composite Golf Club Head. The Niskanen Patent discloses a club head composed of a metal matrix composite of a ceramic matrix composite.

When a golf club head strikes a golf ball, large impacts are produced that load the club head face and the golf ball. Most of the energy is transferred from the head to the golf ball, however, some energy is lost as a result of the collision. The golf ball is typically composed of polymer cover materials (such as ionomers) surrounding a rubber-like core. These softer polymer materials having damping (loss) properties that are strain and strain rate dependent which are on the order of 10-100 times larger than the damping properties of a metallic club striking plate. Thus, during impact most of the energy is lost as a result of the high stresses and deformations of the golf ball (0.001 to 0.20 inches), as opposed to the small deformations of the metallic club face (0.025 to 0.050 inches). A more efficient energy transfer from the club head to the golf ball could lead to greater flight distances of the golf ball.

The generally accepted approach has been to increase the stiffness of the club head face to reduce metal or club head deformations. However, this leads to greater deformations in the golf ball, and thus increases in the energy transfer problem.

Some have recognized the problem and disclosed possible solutions. An example is Campau, U.S. Pat. No. 4,398,965, for a Method Of Making Iron Golf Clubs With Flexible Impact Surface, which discloses a club having a flexible and resilient face plate with a slot to allow for the flexing of the face plate. The face plate of Campau is composed of a ferrous material, such as stainless steel, and has a thickness in the range of 0.1 inches to 0.125 inches.

Another example is Eggiman, U.S. Pat. No. 5,863,261, for a Golf Club Head With Elastically Deforming Face And Back Plates, which discloses the use of a plurality of plates that act in concert to create a spring-like effect on a golf ball during impact. A fluid is disposed between at least two of the plates to act as a viscous coupler.

Yet another example is Jepson et al, U.S. Pat. No. 3,937,474, for a Golf Club With A Polyurethane Insert. Jepson discloses that the polyurethane insert has a hardness between 40 and 75 shore D.

Still another example is Inamori, U.S. Pat. No. 3,975,023, for a Golf Club Head With Ceramic Face Plate, which discloses using a face plate composed of a ceramic material having a high energy transfer coefficient, although ceramics are usually harder materials. Chen et al., U.S. Pat. No. 5,743,813 for a Golf Club Head, discloses using multiple layers in the face to absorb the shock of the golf ball. One of the materials is a non-metal material.

Lu, U.S. Pat. No. 5,499,814, for a Hollow Club Head With Deflecting Insert Face Plate, discloses a reinforcing element composed of a plastic or aluminum alloy that allows for minor deflecting of the face plate which has a thickness ranging from 0.01 to 0.30 inches for a variety of materials including stainless steel, titanium, KEVLAR®, and the like. Yet another Campau invention, U.S. Pat. No. 3,989,248, for a Golf Club Having Insert Capable Of Elastic Flexing, discloses a wood club composed of wood with a metal insert.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club face, Rule 4-1e prohibits the face from having the effect at impact of a spring with a golf ball. In 1998, the USGA adopted a test procedure pursuant to Rule 4-1e which measures club face COR. This USGA test procedure, as well as procedures like it, may be used to measure club face COR.

Although the prior art has disclosed many club head composed of composite materials, the prior art has failed to provide a golf club head composed of a composite material that is lightweight, forgiving and has a high coefficient of restitution.

BRIEF SUMMARY OF THE INVENTION

The present invention provides an apparatus and method for co-curing a face component to an aft-body preform to create a multiple material golf club head.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
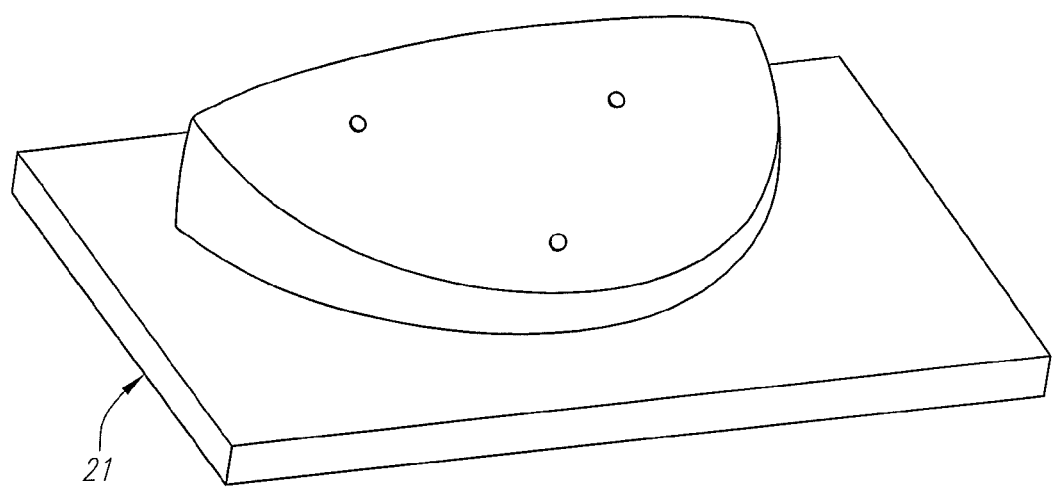
FIG. 1 is a top perspective view of a face loft control piece of a tool assembly.

As shown in the figures, a tool assembly for co-curing a metal face component to an aft-body perform is generally designated 20. The tool assembly is preferably composed of a metal material such as aluminum, stainless steel or a like material. The tool assembly 20 preferably comprises a face loft control piece 21, a face insert piece 22, a gasket retaining piece 23, a sole piece 24 and the crown piece 25. The face loft control piece 21, the face insert piece 22, the sole piece 23 and the crown piece 24 generally define an internal cavity 30.

The face loft control piece 21 preferably has an external front wall 21a, an external top wall 21b, an external bottom wall 21c, an internal aft wall 21d and external side walls 21e. The face insert piece 22 has an external top wall 22a, external bottom wall 22b, an internal front wall 22c, an internal aft wall 22d and external side walls 22e. The internal front wall 22c of the face insert piece 22 is connected to the internal aft wall 21d of the face loft control piece 21. The gasket retaining piece 23 preferably has a front surface 23a and an aft surface 23b. The front surface 23a of the gasket retaining piece is preferably connected to the internal aft wall 22d of the face insert piece 22. The sole piece 24 preferably has an internal front wall 24a, an external rear wall 24b, an external bottom wall 24c, an internal top wall 24d and external side walls 24e. The internal front wall 24a of the sole piece 24 is connected to the aft surface 23b of the gasket retaining piece 23. The crown piece 25 preferably has an internal front wall 25a, an external rear wall 25b, an internal bottom wall 25c, an external top wall 25d and external side walls 25e. The internal front wall 25a of the crown piece 25 is connected to the aft surface 23b of the gasket retaining piece 23 and the internal bottom wall 25c of the crown piece 25 is connected to the internal top wall 24d of the sole piece 24.

As shown in the figures, a face component 160 is placed within the face loft control piece 21 and the face insert piece 22. The face loft component piece 21 allows for changes to the loft of a face component without the need of an entirely different tool assembly 20. Thus, if one club head 142 has a loft of ten degrees it is co-cured with a face loft control piece 21 corresponding to ten degrees. If another club head 142 has a loft of eight degrees, a second face loft control piece 21 is substituted for the first face loft control piece 21.

Figure 2:
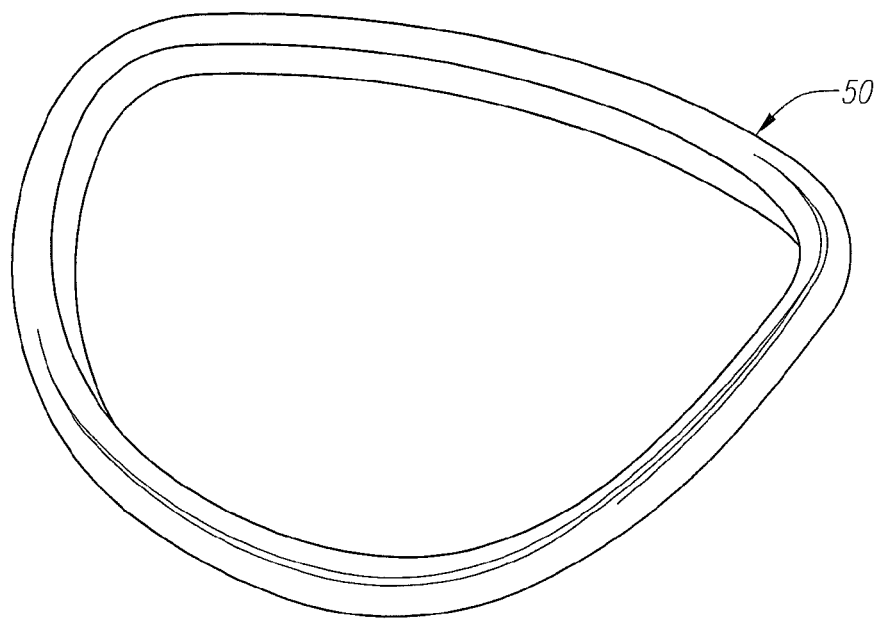
FIG. 2 is a plan view of a gasket.
Figure 3:
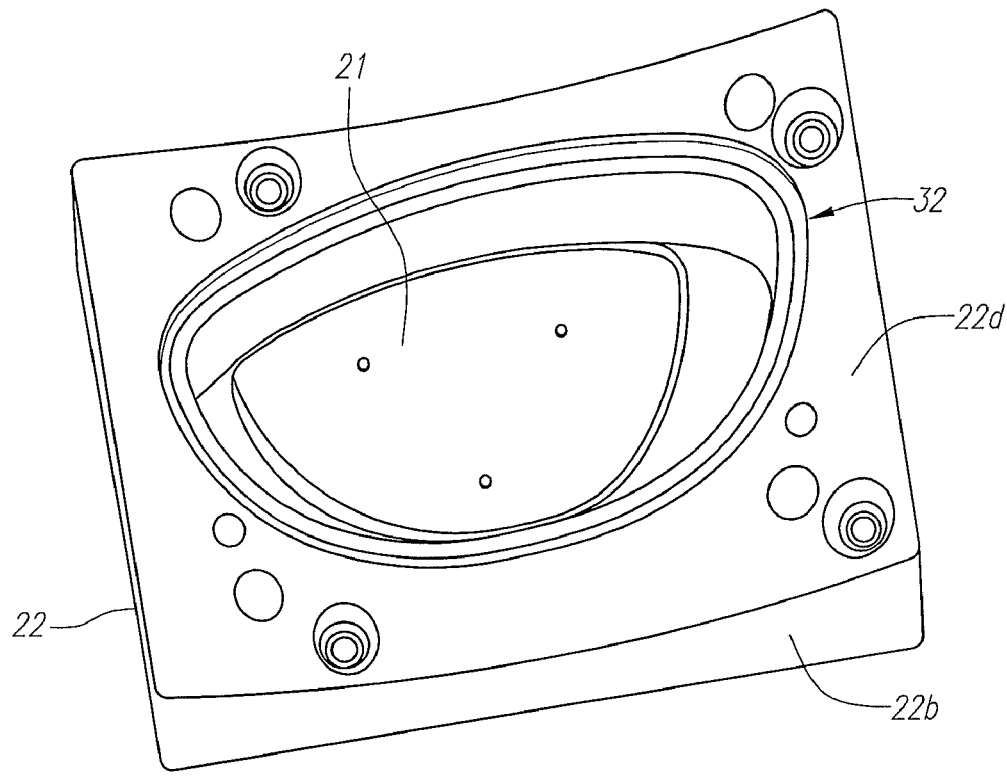
FIG. 3 is a bottom perspective view of a face insert piece connected to a face control piece of a tool assembly.
Figure 4:
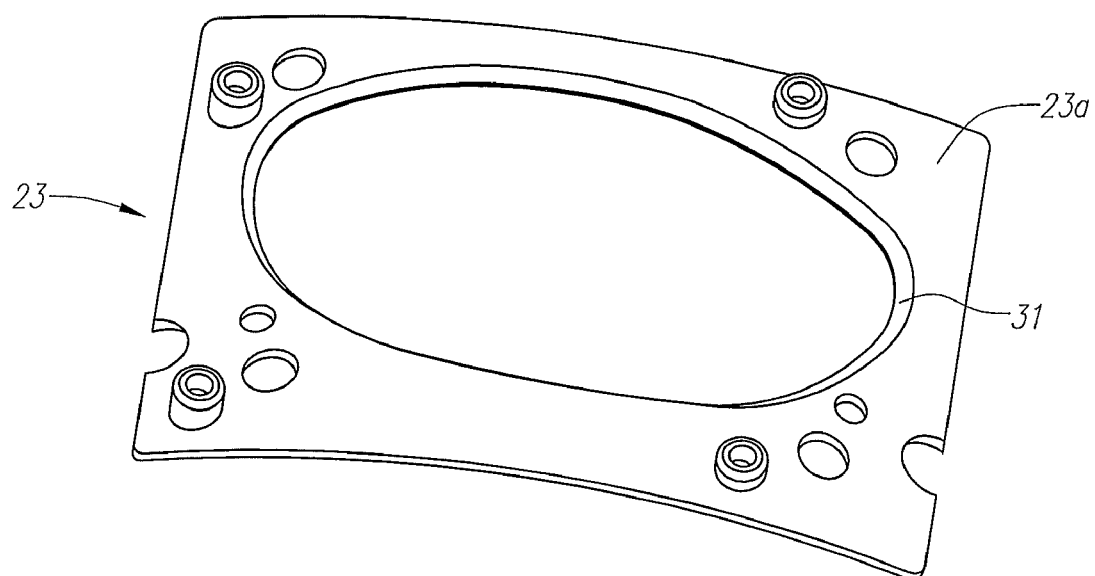
FIG. 4 is a plan view of a gasket retaining piece of a tool assembly.
Figure 5:
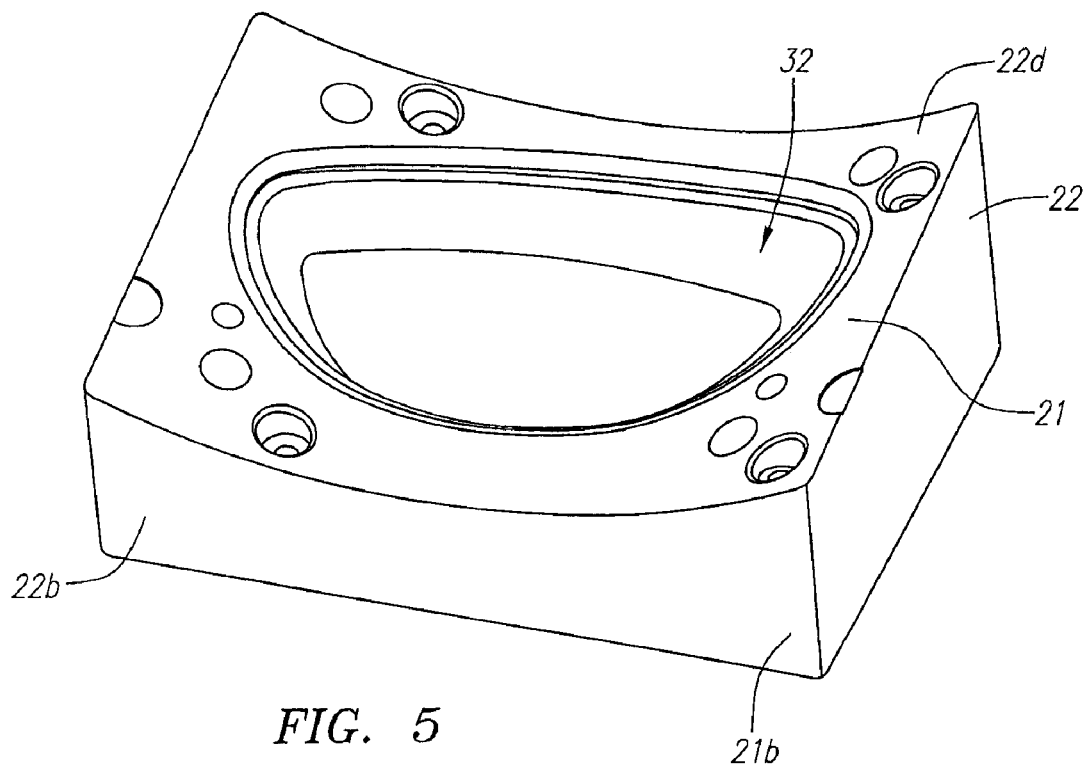
FIG. 5 is a perspective view of a face insert piece connected to a face control piece of a tool assembly.
Figure 6:
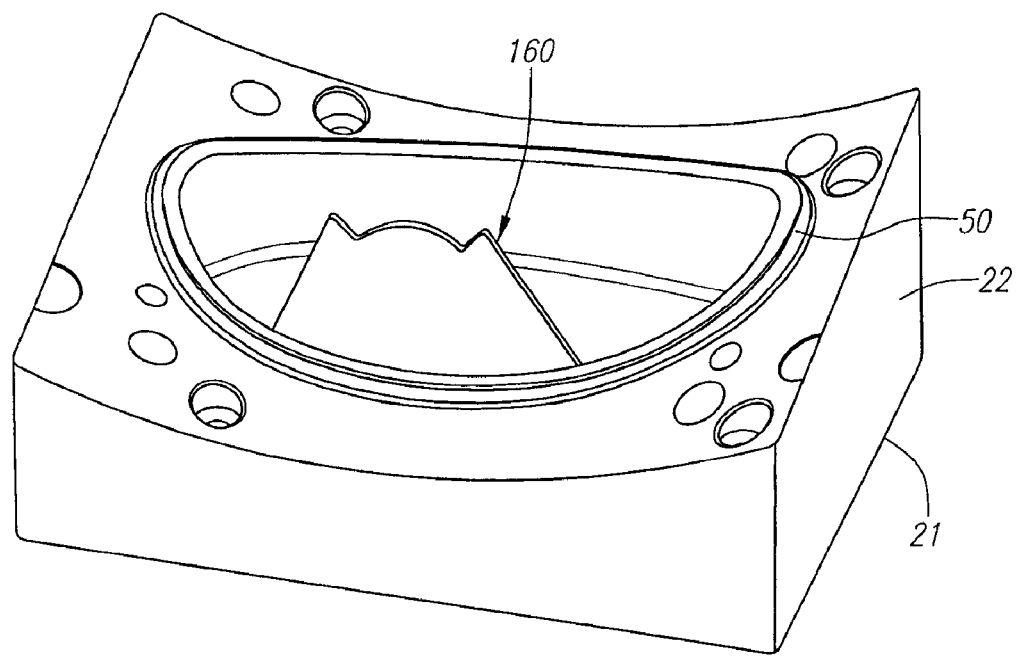
FIG. 6 is a phantom perspective view of a face insert piece connected to a face control piece of a tool assembly with a face component therein.
Figure 7:
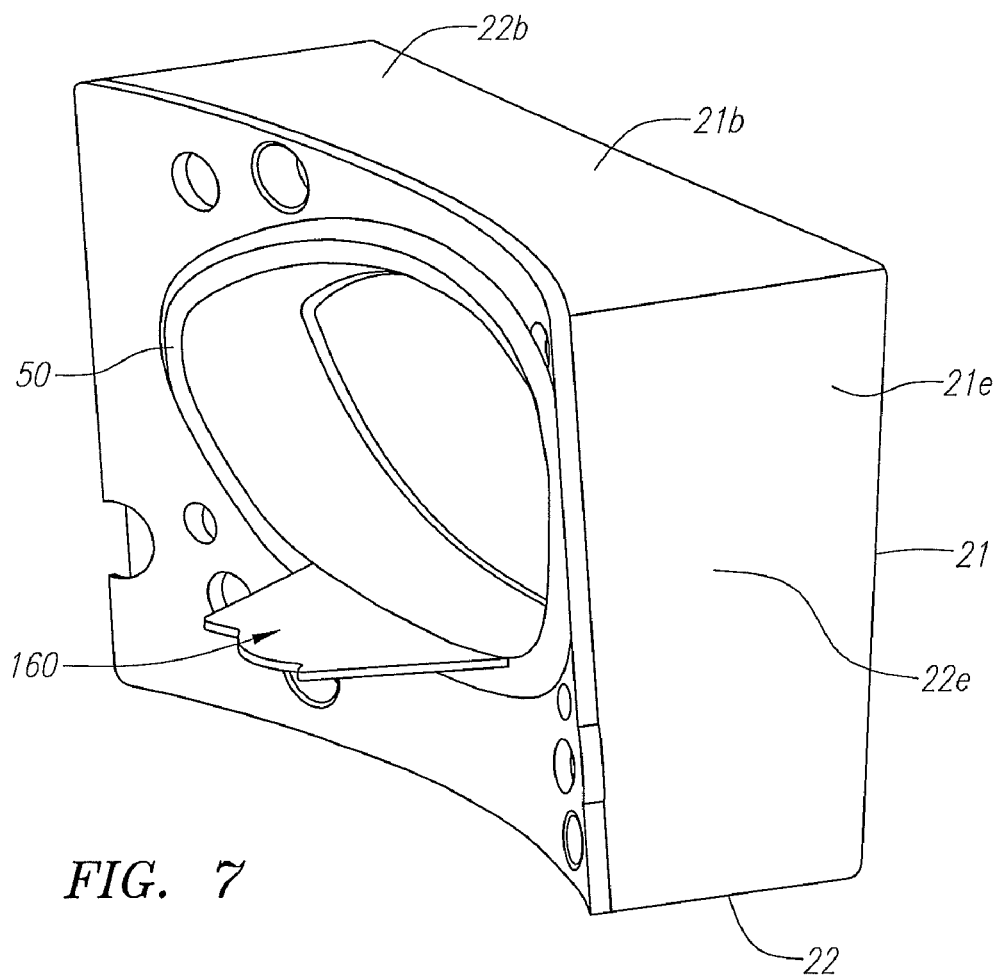
FIG. 7 is a phantom side perspective view of a face insert piece connected to a face control piece of a tool assembly with a face component therein.

A gasket 50, as shown in FIG. 2, is placed within a gasket groove 32 of the face insert piece 22 and also within a gasket groove 31 of the gasket retaining piece 23. The gasket 50 is preferably composed of silicone, cast urethane, VITON or other elastomeric materials. The gasket 50 preferably has a thickness of 0.040 inch to 0.250 inch. The gasket 50 prevents resin material from entering the area of the face component 160 during the co-curing process. The gasket retaining piece 23 is preferably attached to the face insert piece 22 after the face component 160 is placed within the face loft control piece 21 and the face insert piece 22.

Figure 21:
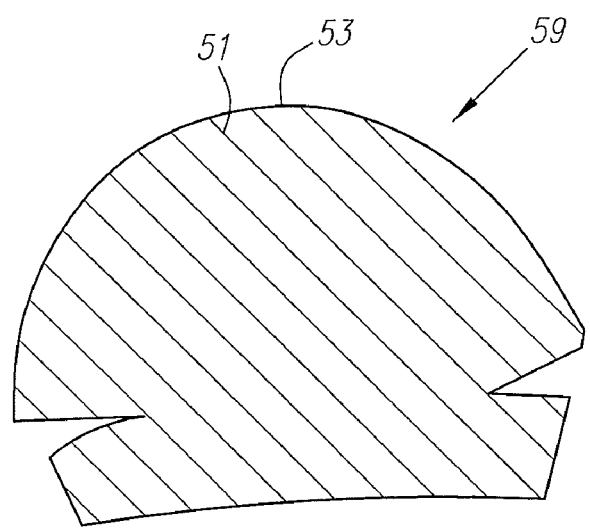
FIG. 21 is a plan view of a ply of pre-preg material.

In a preferred embodiment, the aft-body pre-form 70 is composed of two components, a sole pre-form 72 and a crown pre-form 73. Each pre-form 72 and 73 is composed of plies of pre-preg material. A ply 59 is shown in FIG. 21 and it has a resin body 53 with preferably carbon fiber strands 51. In a preferred embodiment, each pre-form 72 and 73 is composed of from 3 plies to 10 plies, more preferably from 5 plies to 9 plies, and most preferably 9 plies. The final thickness of the aft-body of the club head 142 is preferably 0.030 inch to 0.035 inch. A plunger 700 is preferably used to form the pre-forms, and such a plunger 700 is described in more detail in U.S. Pat. No. 6,695,608, which pertinent parts concerning the plunger are hereby incorporated by reference.

Figure 8:
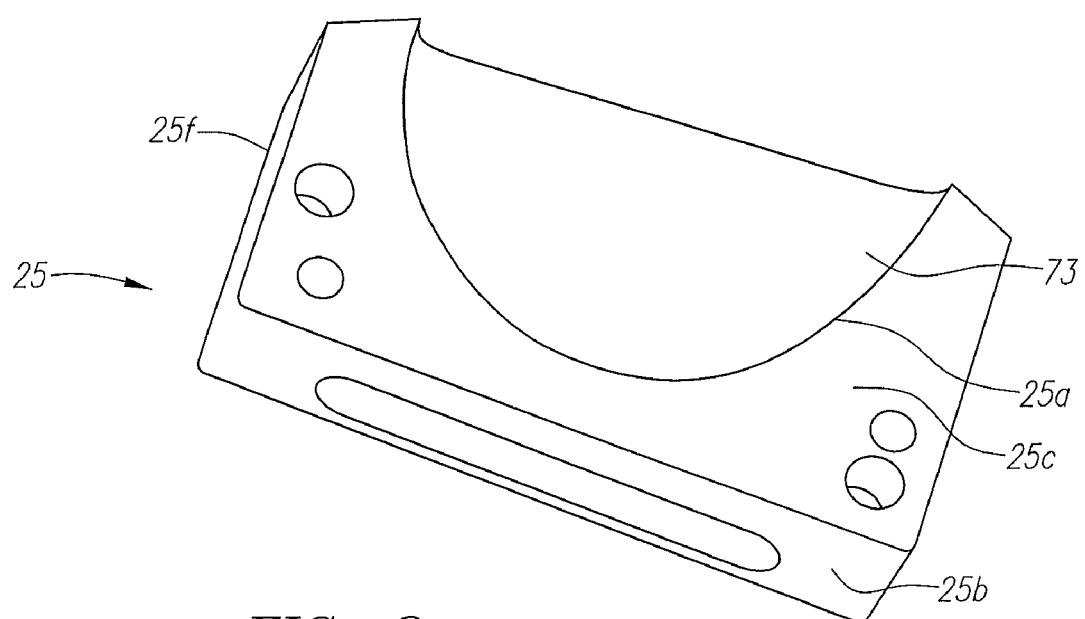
FIG. 8 is a bottom perspective view of a crown piece with a crown pre-form therein.
Figure 9:
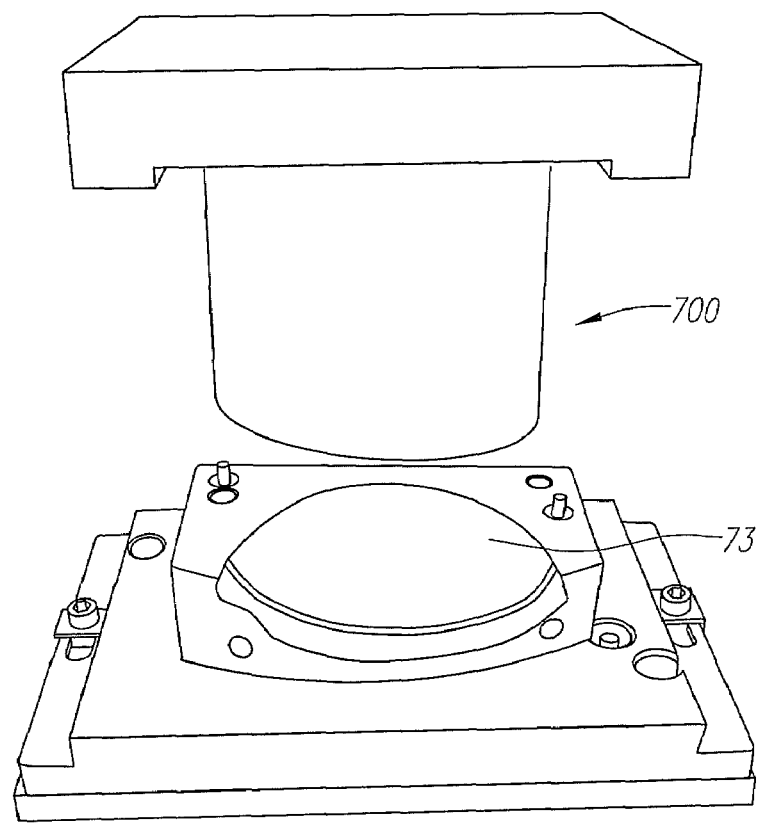
FIG. 9 is a front view of a plunger device forming a crown pre-form.
Figure 10:
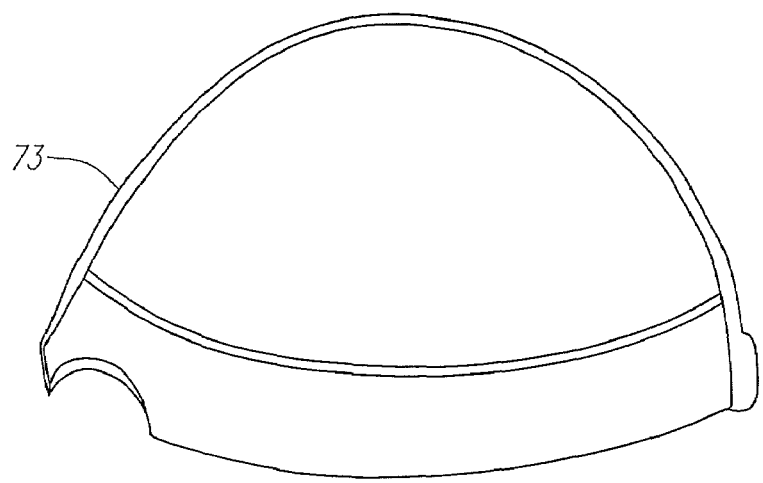
FIG. 10 is a top view of a crown pre-form.
Figure 11:
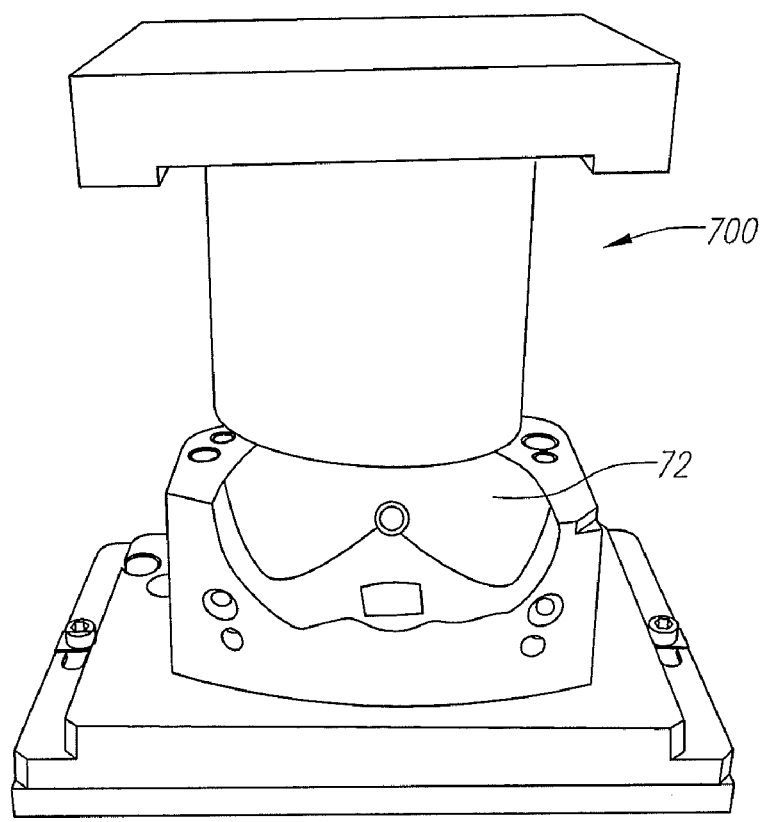
FIG. 11 is a front view of a plunger device forming a sole pre-form.
Figure 12:
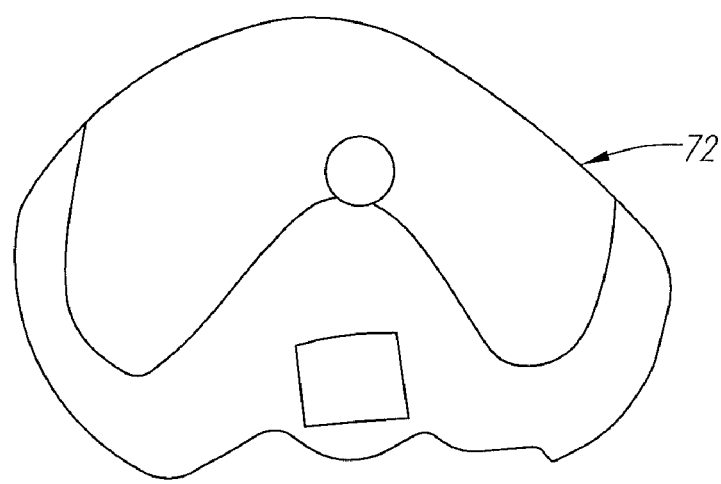
FIG. 12 is a top view of a sole pre-form.
Figure 13:
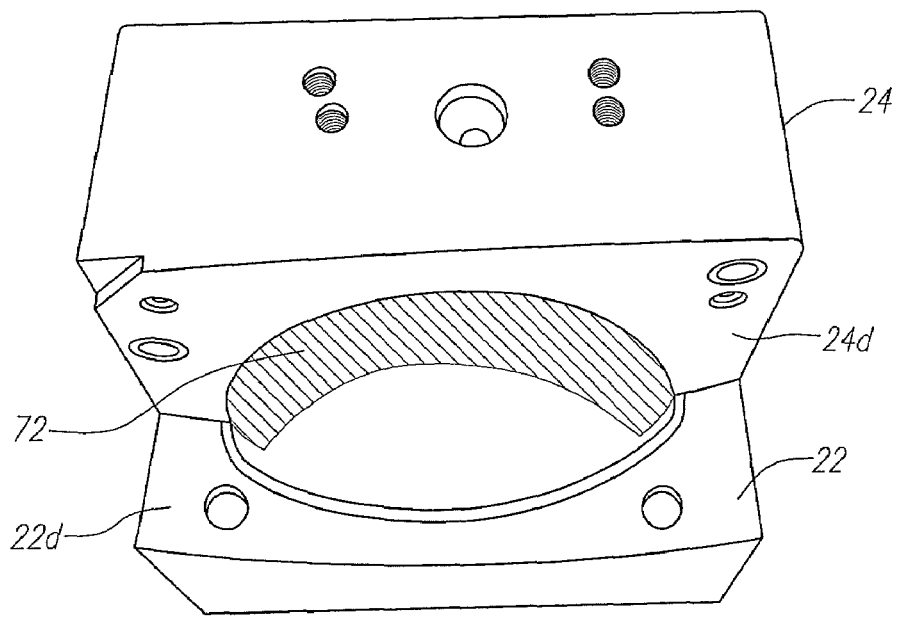
FIG. 13 is an inverted perspective view of a sole pre-form within a portion of a tool assembly.
Figure 14:
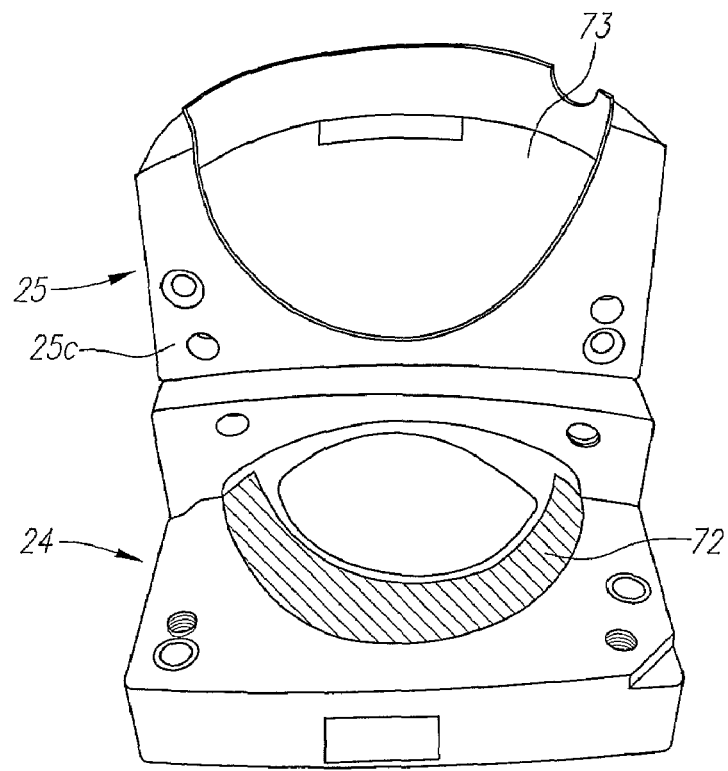
FIG. 14 is a front view of a sole pre-form within a sole piece and a crown pre-form within a crown piece.
Figure 15:
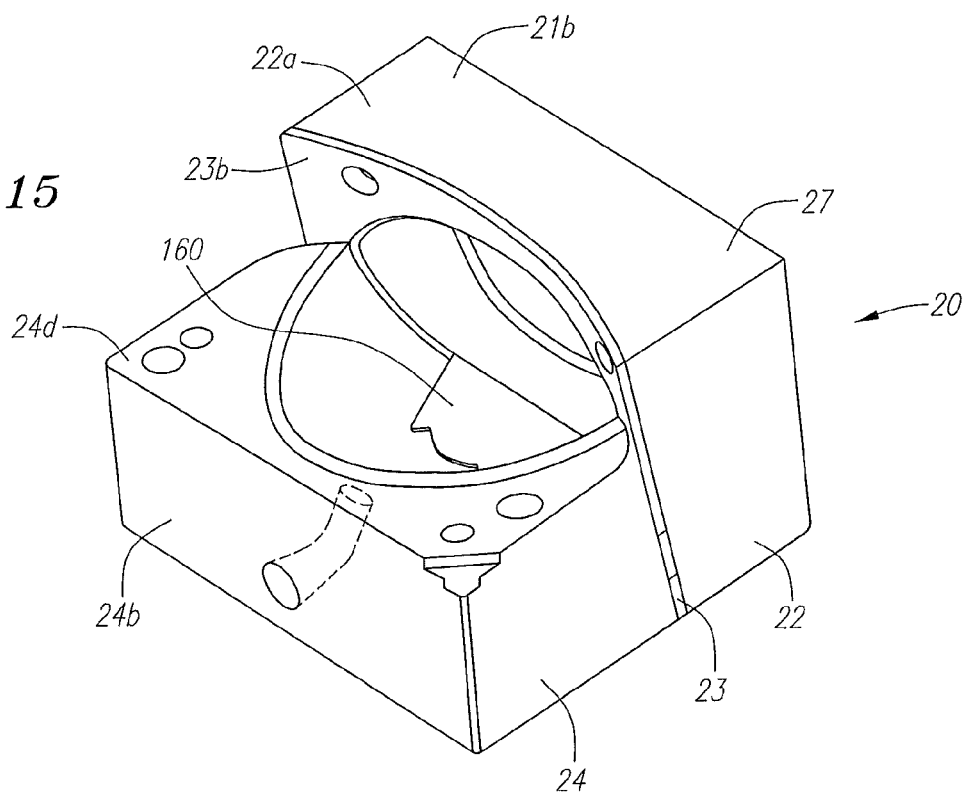
FIG. 15 is a phantom view of a tool assembly without a crown piece and with a face component therein.
Figure 16:
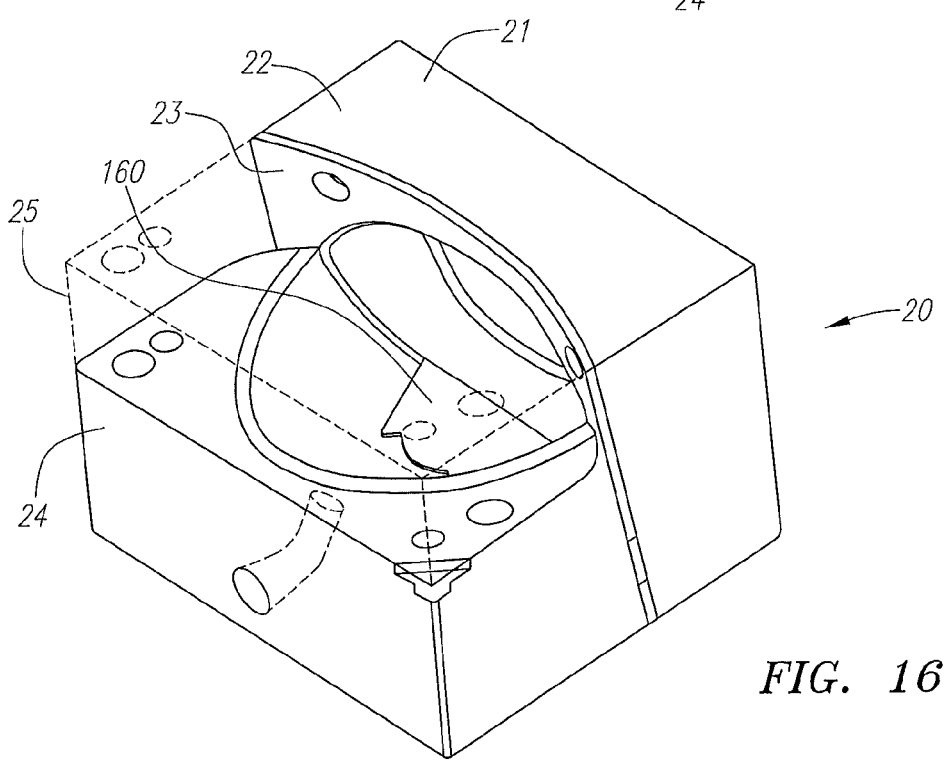
FIG. 16 is a phantom perspective of a tool assembly with precursor components therein.
Figure 17:
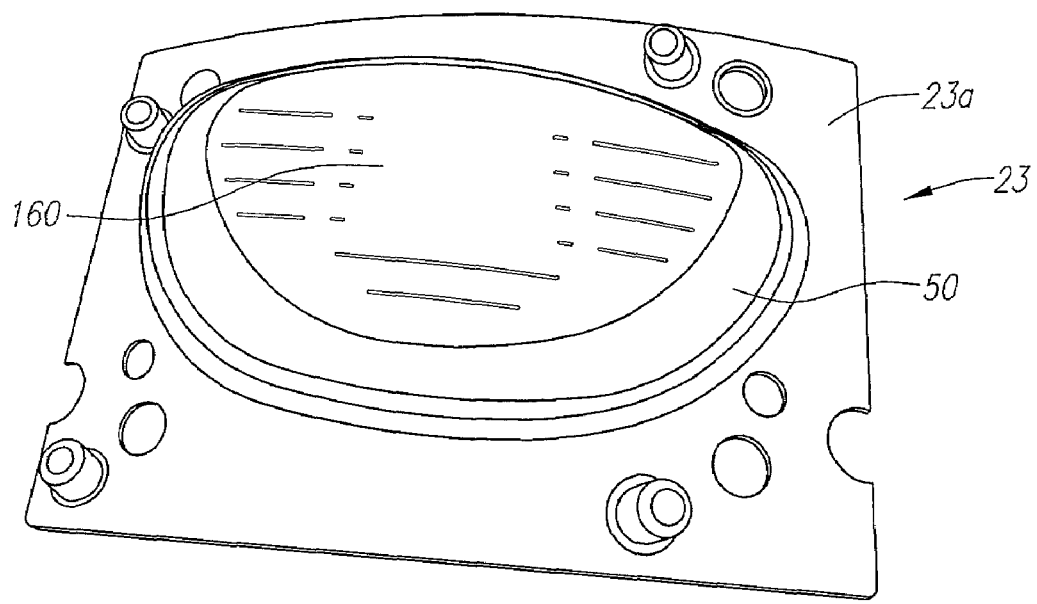
FIG. 17 is a front view of a face component within a gasket retaining device and with a groove positioned on the gasket retaining device.
Figure 18:
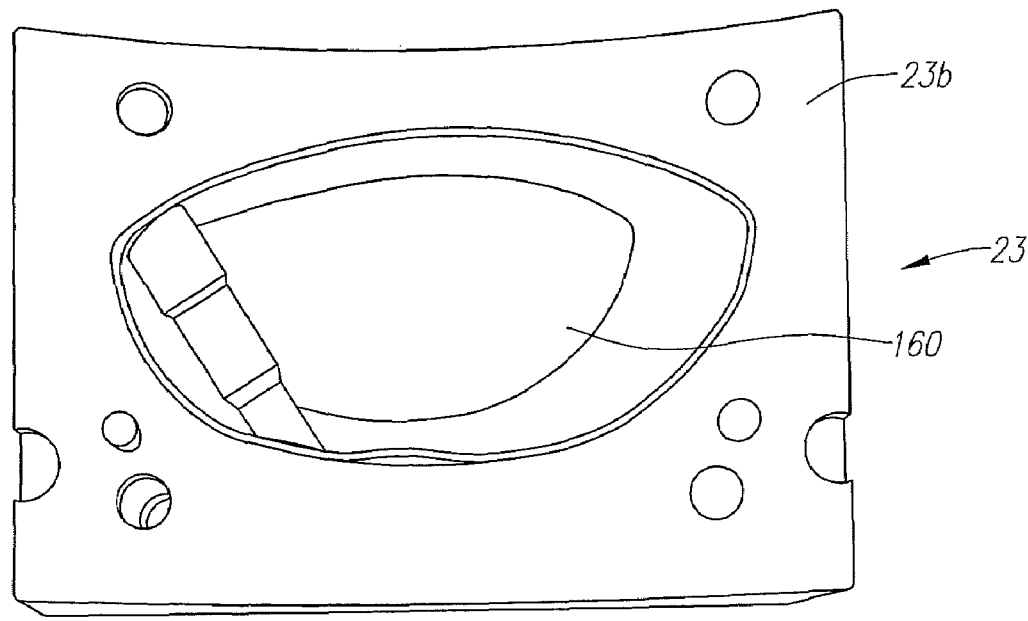
FIG. 18 is a back view of a face component within a gasket retaining device and with a groove positioned on the gasket retaining device.
Figure 19:
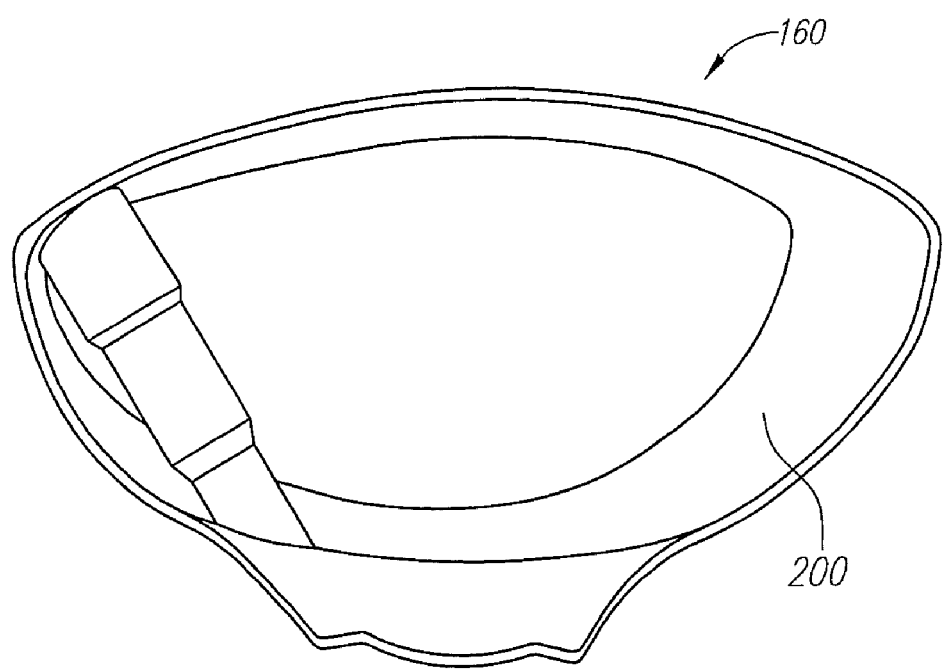
FIG. 19 is an isolated view of a metal face component with a film adhesive positioned within a return portion of the face component.

As shown in FIGS. 8, 13 and 14, the sole pre-form 72 is placed within a cavity of the sole piece 24 and the crown pre-form 73 is placed within a cavity of the crown piece 25.

The ply 59 preferably has a plurality of fibers 51 dispersed within a resin body 53. The fibers 51 are preferably composed of a carbon material. Alternatively, the fibers 51 may be aramid fibers, glass fibers or the like. The resin is typically an epoxy material. The relation of the fibers 51 to a general direction determines the orientation of the fibers 51. If the fibers 51 are parallel with the ground, or in other words extending across from the toe end to the heel end, then the ply 59 has a zero degree orientation. If the fibers 51 are approximately perpendicular to the ground, or in other words extending from the crown to the sole, then the ply 59 has a ninety degrees orientation. The fibers 51 in FIG. 21 extend at a forty-five degree angle relative to the ground. Therefore, the ply 59 has a forty-five degree orientation.

The preferred composite material is plies of carbon pre-peg sheets. Plies of pre-preg composite sheets are manufactured by pulling strands of fiber in a parallel motion, preferably carbon, aramid or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and ninety degrees. Exemplary carbon pre-preg fiber sheets may be obtained from Newport Composites of Santa Ana, Calif., Fiberite Inc. of Greenville, Tex., or Hexcel Inc. of Pleasonton, Calif.

Figure 30:
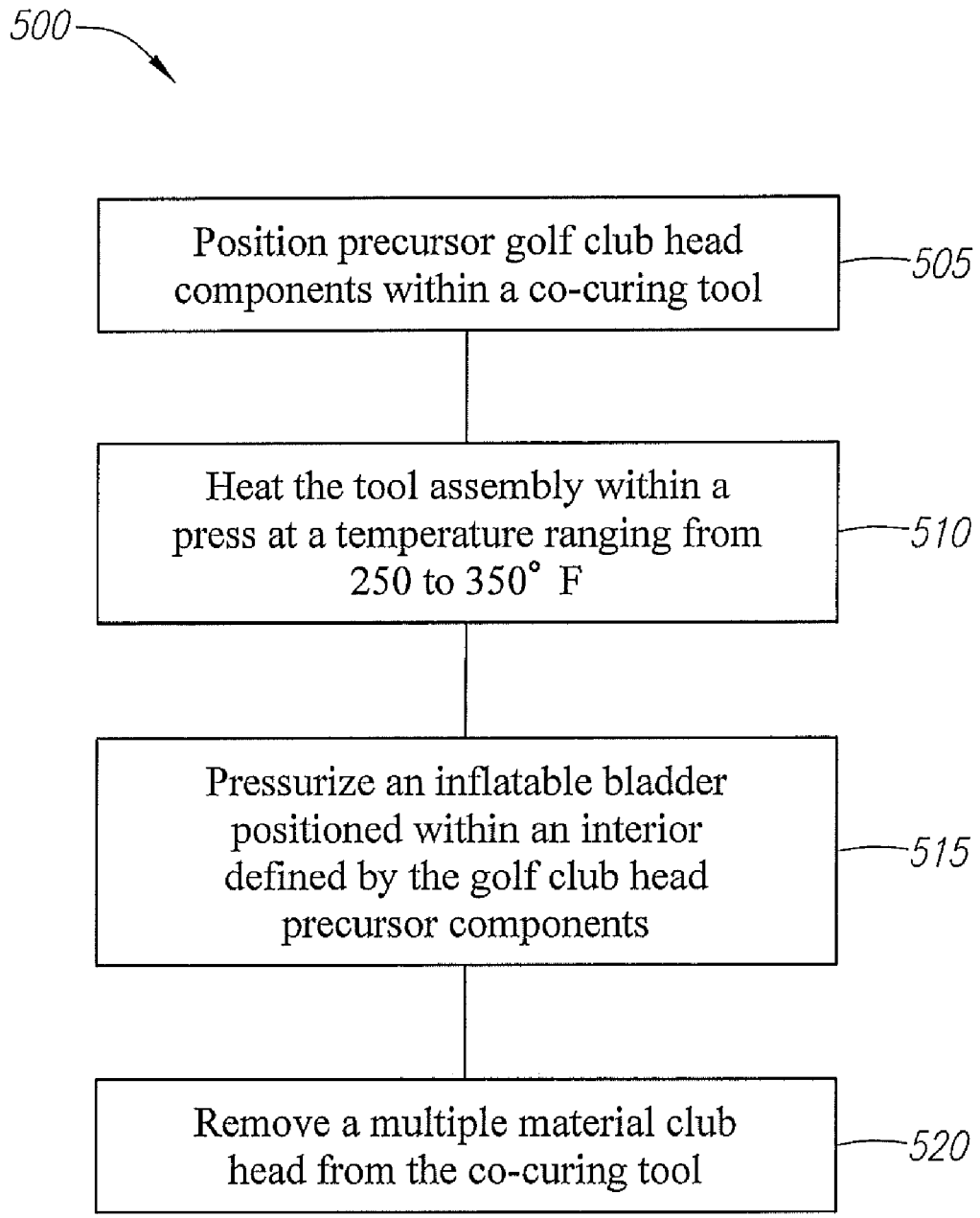
FIG. 30 is a flow chart of a general method of the present invention.

A general method 500 of the present invention is show in FIG. 30. At block 505, the precursor components of the club head 142 are positioned within the tool assembly 20 and the tool assembly 20 is assembled. At block 510, the tool assembly 20, with the face component 160 and the aft-body pre-form 70 positioned within, is heated within a press at a temperature ranging from 250 to 350° F. for a time period ranging from five minutes to sixty minutes depending on the temperature. A more preferred temperature is 310-325° F. and a more preferred time period is from ten minutes to fifteen minutes. A most preferred temperature of the press is 325° F. and a most preferred time is twelve minutes.

At block 515, an inflatable bladder positioned within the hollow interior formed by the precursor components of the golf club head 142 is preferably inflated at a pressure ranging from 50-200 pounds per square inch ("PSI"), and most preferably at 150 PSI. During the co-curing, a source of pressurized gas (not shown) is attached by a gas line to the inflatable bladder, and the bladder is inflated within the hollow interior of the pre-form unit. The bladder engages the inside surface of the pre-firm unit, forcing the plies of pre-preg sheets against the inner wall of the tool assembly 20. The tool assembly 20 is heated within the press at the predetermined temperature for the selected period of time, i.e., a time sufficient to allow proper curing of the resin within the pre-preg sheets. At block 520, after depressurizing, the bladder is removed through the bladder port and the molded unfinished golf club head is removed from the tool assembly 20.

Figure 31:
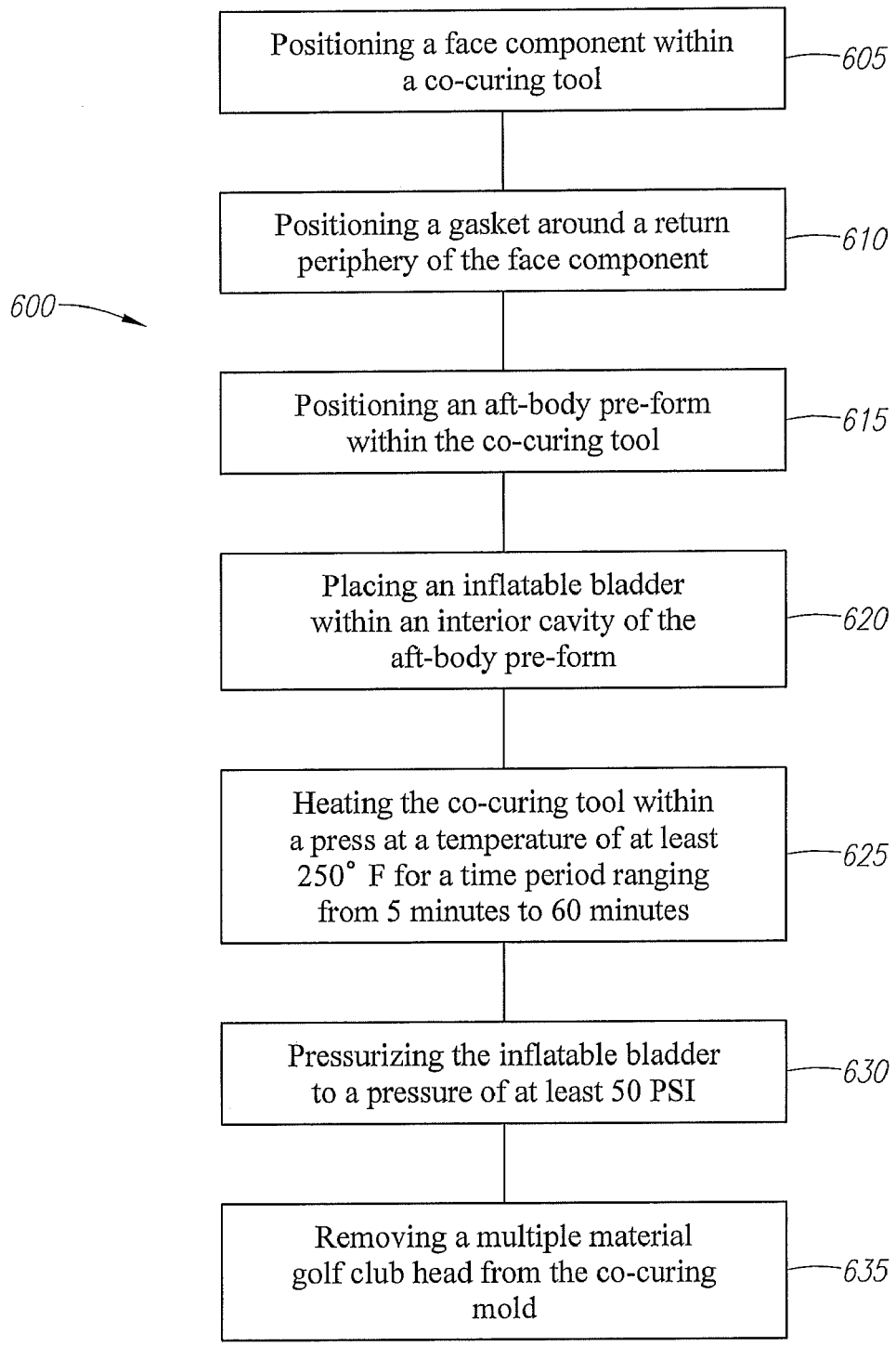
FIG. 31 is a flow chart of a specific method of the present invention.

A more specific method 600 is shown in FIG. 31. At block 605, the face component 160 is positioned in the face loft control piece 21 and the face insert piece 22. A film adhesive 200 is placed around the interior of the return portion of the face component 160 to assist in adhering the aft-body pre-form 70 to the face component 160 during the co-curing process. Such adhesive include CYTEC FM73, FM94 and FM300-2, NEWPORT 101, NB3500 and 3M AF500. The film adhesive preferably has a thickness ranging from 0.005 inch to 0.015 inch. At block 610, the gasket 50 is positioned about the periphery of the return portion of the face component 160 and the gasket retaining piece 23 is positioned to prevent resin from entering the face component 160. At block 615, the aft-body pre-form is positioned within the tool assembly 20. More specifically, the crown pre-form 73 is positioned within the crown piece 25 and the sole pre-form 72 is positioned within the sole piece 24. At block 620, the inflatable bladder is positioned within the hollow interior of the precursor components. At block 625, the tool assembly 20 is placed within a press and the press is heated at a temperature of at least 250° F. for a time period ranging from five minutes to sixty minutes. At block 630, the inflatable bladder is pressurized to a pressure of at least 50 PSI. At block 635, the multiple material club head 142 is removed from the tool assembly 20.

Figure 20:
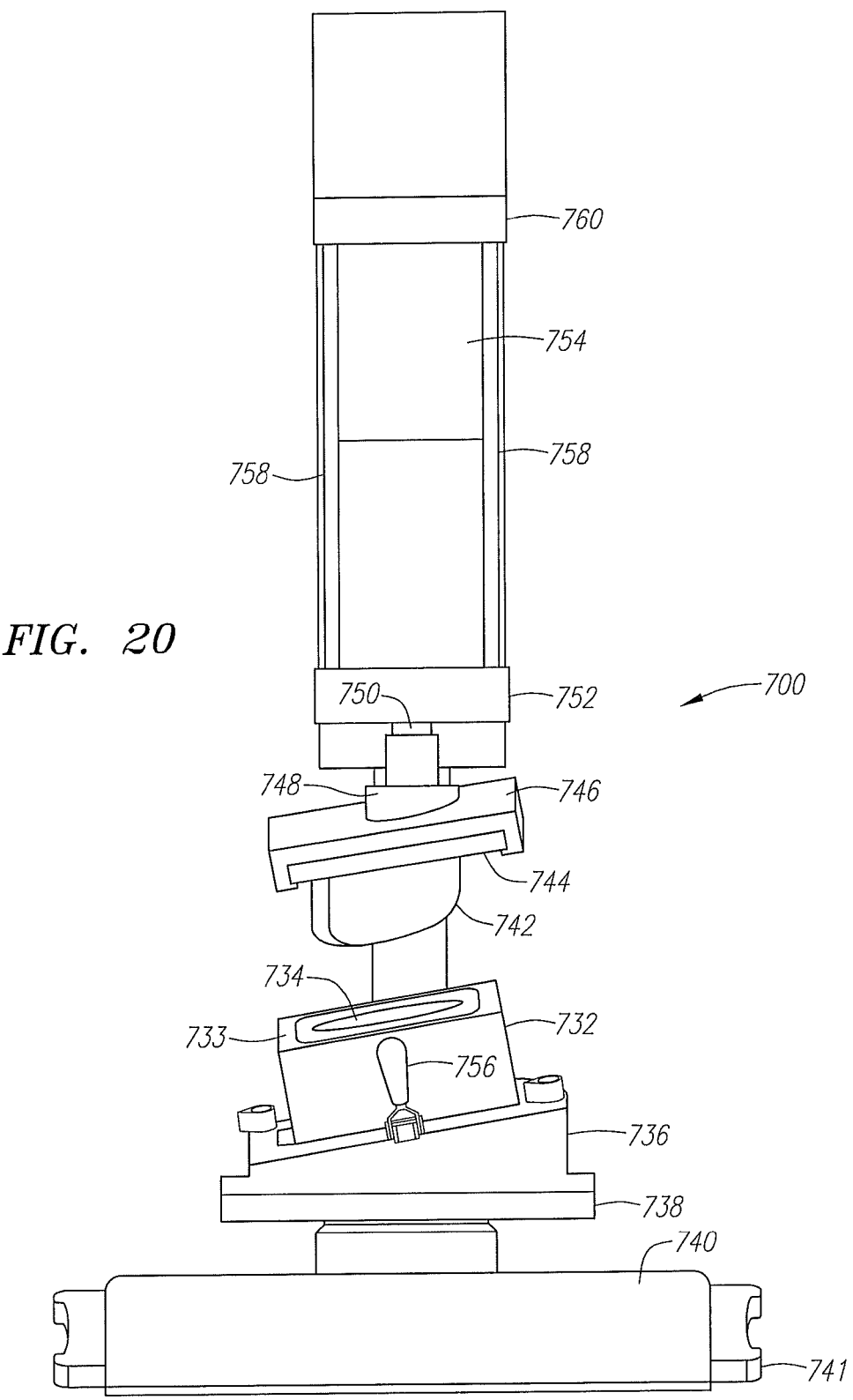
FIG. 20 is a side view of a plunger device.

A plunger 700 is shown in FIG. 20. The plunger head 742 conforms to the shape and volume of the component to be molded. A plunger head 742 is mounted on a removable plunger plate 744. The plunger head 742 is preferably comprised of silicone, urethane or other elastomeric materials and preferably has a durometer ranging from 25 to 85 shore A and an elongation range of 100% to 700%. The plunger head 742 and removable plunger plate 744 is located above the cavity 734 and is used to compress the plies of pre-preg sheets into the cavity 734. The plunger head 742 may be of various sizes to approximate the size of the cavity 734 and is designed so that as the size of the plunger head 742 decreases, the corresponding volume of the preform that is created by using the plunger head 742 decreases. The removable plunger plate 744 allows for an assortment of plunger heads 742 to be interchanged to approximate the particular cavity size chosen for manufacturing a crown pre-form 73 or a sole pre-form 72.

Once the particular preform to be manufactured is chosen, the plunger head 742 is activated to press the plies into the cavity to form the preform. Preferable pressure ranges for the plunger head 742 may range from 30-80 psi, however these ranges may be increased or decreased depending upon variations in the materials chosen to fabricate the preforms. The removable plunger plate 744 with attached plunger head 742 is mounted to a fixed plate 746. The fixed plate 746 is subsequently attached via an attachment piece 748 to a moveable rod 750 located in a bottom portion of a lower support plate 752. The lower support plate 752 is used to support a pnuematic cylinder 754. Thus, aligning the pnuematic cylinder 754, plunger head 742, and cavity 734 along a longitudinal axis. The pnuematic cylinder 754 travels up and down in a vertical direction to allow oscillation of the plunger head 742 in and out of the cavity 734 along this longitudinal axis. A release lever 756 is located on the mold support plate 736 and is used to raise the plunger head 742 once the pre-preg plies have been compressed in the cavity 734. The pnuematic cylinder 754 is held in place by a series of support rods 758a-d in conjunction with the lower support plate 752 and an upper support plate 760. A mounting plate 762 is attached to a rear portion of the upper support plate 760 at one end and to the lower support plate 752 at an opposite end. A support arm 764 is used to align the mounting plate 762 in a vertical direction and is attached at one end to the mounting plate 762 and at an opposite end to the apparatus base 740.

As shown in FIGS. 23-29, a golf club head formed by the co-curing process is generally designated 142. The club head 42 is generally composed of two components, a face component 160 (shown in isolation in FIG. 22), and an aft-body 161. The aft-body 161 has a crown portion 162 and a sole portion 164. The club head 142 is preferably partitioned into a heel section 166 nearest a shaft, a toe section 168 opposite the heel section 166, and a rear section 170 opposite the face component 160. A sole weighting member 133 is disposed within a sole undercut portion 133a of the sole portion. The sole weighting member has a mass ranging from 0.5 grams to 15 grams.

The face component 160 is generally composed of a single piece of metal, and is preferably composed of a forged metal material. More preferably, the forged metal material is a forged titanium material. Such titanium materials include pure titanium and titanium alloys such as 6-4 titanium alloy, SP-700 titanium alloy (available from Nippon Steel of Tokyo, Japan), DAT 55G titanium alloy available from Diado Steel of Tokyo, Japan, Ti 10-2-3 Beta-C titanium alloy available from RTI International Metals of Ohio, and the like. Other metals for the face component 160 include stainless steel, other high strength steel alloy metals and amorphous metals. Alternatively, the face component 160 is manufactured through casting, forming, machining, powdered metal forming, metal-injection-molding, electro chemical milling, and the like.

Figure 22:
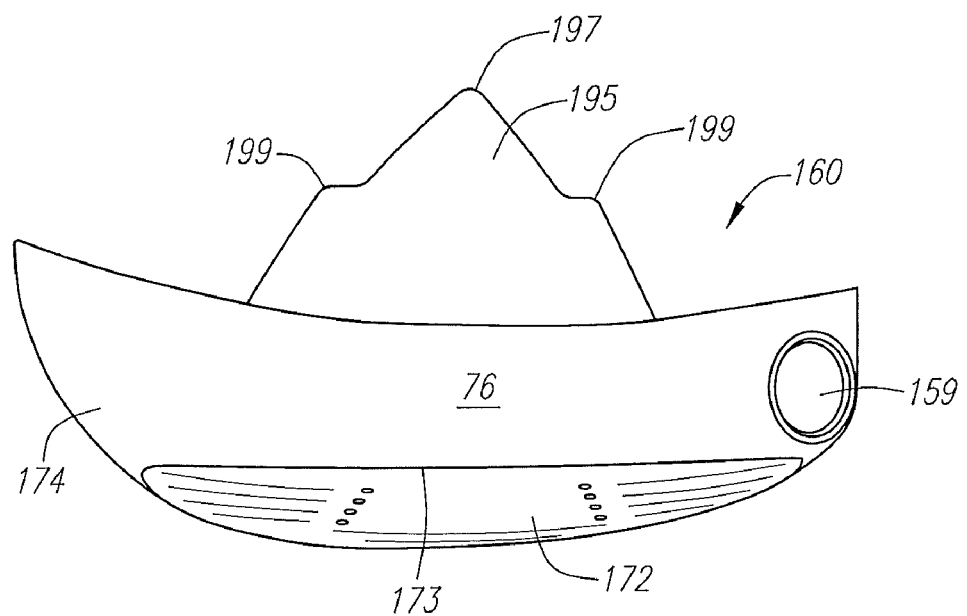
FIG. 22 is an isolated top view of a face component.
Figure 23:
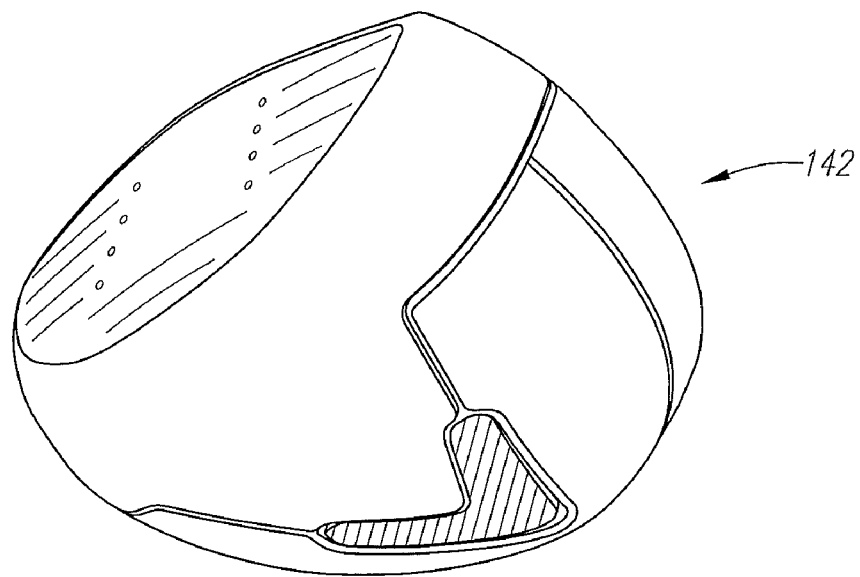
FIG. 23 is a bottom perspective view of a multiple material golf club head.
Figure 24:
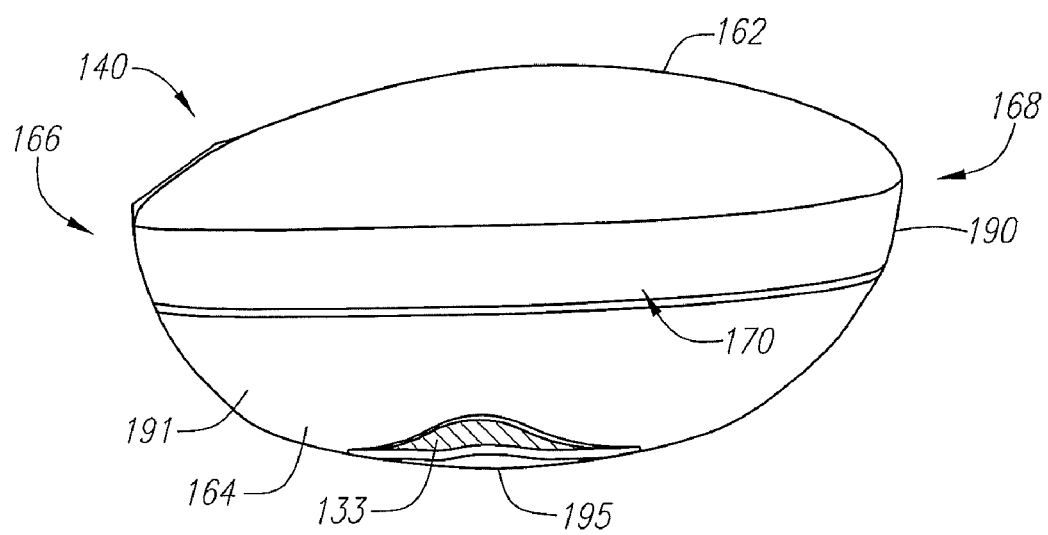
FIG. 24 is a rear view of a golf club head.
Figure 25:
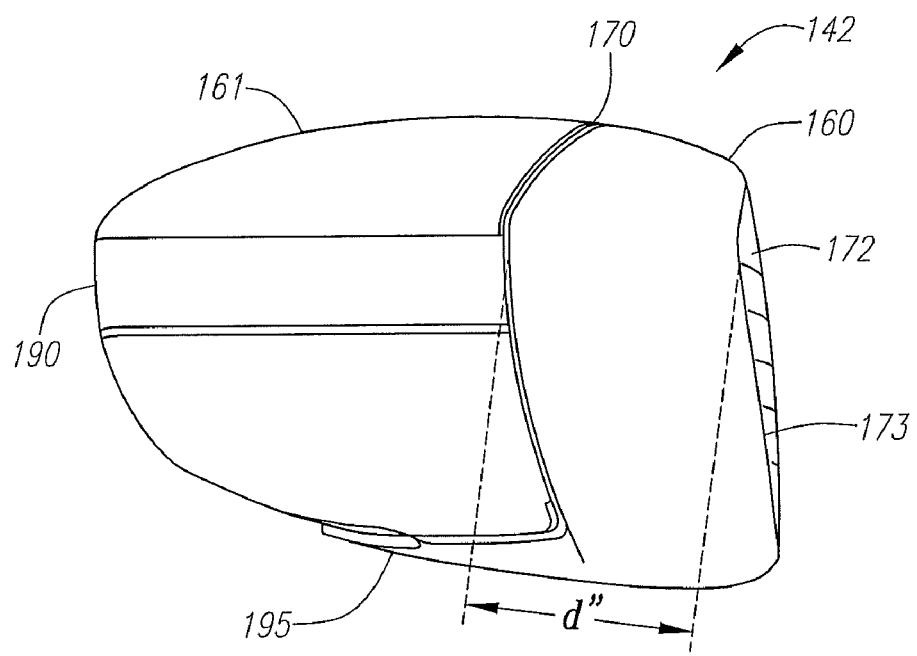
FIG. 25 is toe side view of the golf club head of FIG. 24.
Figure 26:
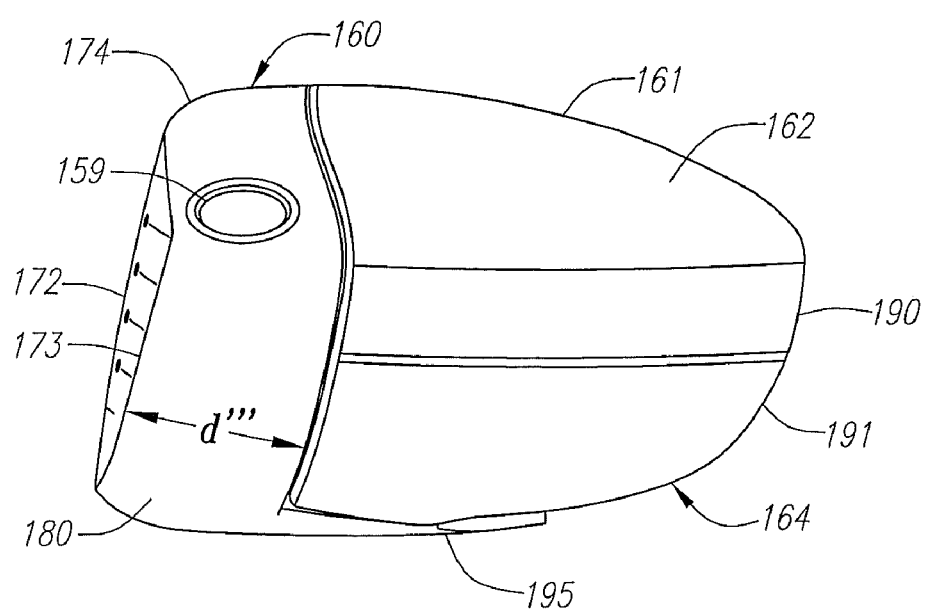
FIG. 26 is a heel side plan view of the golf club head of FIG. 24.
Figure 27:
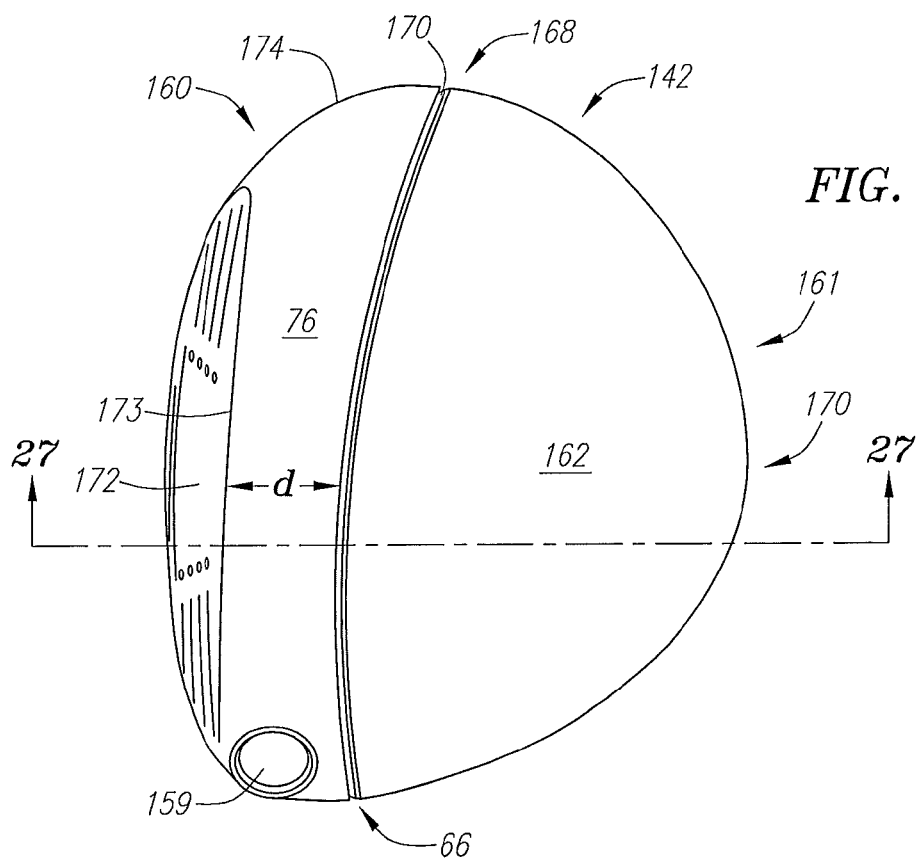
FIG. 27 is a top plan view of the golf club head of FIG. 24.
Figure 28:
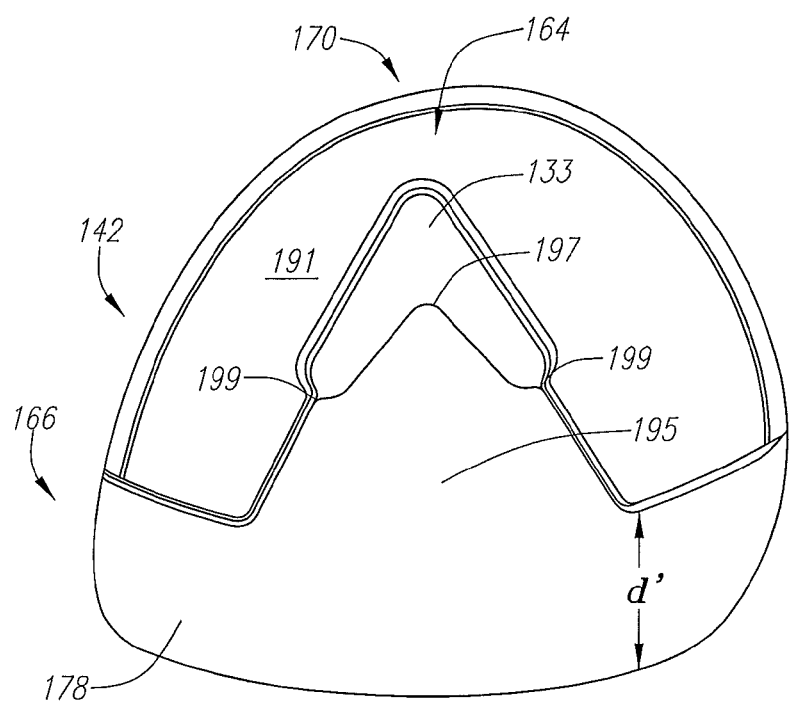
FIG. 28 is a bottom view of the golf club head of FIG. 24.

FIG. 22 illustrates the face component 160 in isolation. The face component 160 generally includes a striking plate portion (also referred to herein as a face plate) 172 and a return portion 174 extending laterally inward from the perimeter of the striking plate portion 172. The striking plate portion 172 typically has a plurality of scorelines 175 thereon.

In a preferred embodiment, the return portion 174 generally includes an upper lateral section 176, a lower lateral section 178 with a sole extension 195, a heel lateral section 180 and a toe lateral section 182. Thus, the return 174 preferably encircles the striking plate portion 172 a full 360 degrees. However, those skilled in the pertinent art will recognize that the return portion 174 may only encompass a partial section of the striking plate portion 172, such as 270 degrees or 180 degrees, and may also be discontinuous.

The upper lateral section 176 extends inward, towards the aft-body 161, a predetermined distance, d, to engage the crown 162. In a preferred embodiment, the predetermined distance ranges from 0.2 inch to 1.0 inch, more preferably 0.40 inch to 0.75 inch, and most preferably 0.68 inch, as measured from the perimeter 173 of the striking plate portion 172 to the rearward edge of the upper lateral section 176. In a preferred embodiment, the upper lateral section 176 has a general curvature from the heel section 166 to the toe section 168. The upper lateral section 176 has a length from the perimeter 173 of the striking plate section 172 that is preferably a minimal length near the center of the striking plate section 172, and increases toward the toe section 168 and the heel section 166.

The perimeter 173 of the striking plate portion 174 is defined as the transition point where the face component 160 transitions from a plane substantially parallel to the striking plate portion 172 to a plane substantially perpendicular to the striking plate portion 172. Alternatively, one method for determining the transition point is to take a plane parallel to the striking plate portion 172 and a plane perpendicular to the striking plate portion, and then take a plane at an angle of forty-five degrees to the parallel plane and the perpendicular plane. Where the forty-five degrees plane contacts the face component is the transition point thereby defining the perimeter of the striking plate portion 172.

The present invention preferably has the face component 160 engage the crown 162 along a substantially horizontal plane. The crown 162 has a crown undercut portion 162a, which is placed under the return portion 174. Such an engagement enhances the flexibility of the striking plate portion 172 allowing for a greater coefficient of restitution. The crown 162 and the upper lateral section 176 are attached to each other as further explained below.

The heel lateral section 180 is substantially perpendicular to the striking plate portion 172, and the heel lateral section 180 covers the hosel 154 before engaging an optional ribbon section 190 and a bottom section 191 of the sole portion 164 of the aft-body 161. The heel lateral section 180 is attached to the sole 164, both the ribbon 190 and the bottom section 191, as explained in greater detail below. The heel lateral section 180 extends inward a distance, d", from the perimeter 173 a distance of 0.250 inch to 1.50 inches, more preferably 0.50 inch to 1.0 inch, and most preferably 0.950 inch. The heel lateral section 180 preferably has a general curvature at its edge.

At the other end of the face component 160 is the toe lateral section 182. The toe lateral section 182 is attached to the sole 164, both the ribbon 190 and the bottom section 191, as explained in greater detail below. The toe lateral section 182 extends inward a distance, d''', from the perimeter 173 a distance of 0.250 inch to 1.50 inches, more preferably 0.75 inch to 1.30 inch, and most preferably 1.20 inch. The toe lateral section 180 preferably has a general curvature at its edge.

The lower lateral section 178 extends inward, toward the aft-body 161, a distance, d', to engage the sole 164, and a sole extension 195 extends further inward a distance $d^s$ to preferably function as protection for the sole of the club head 142. In a preferred embodiment, the distance d' ranges from 0.2 inch to 1.25 inches, more preferably 0.50 inch to 1.10 inch, and most preferably 0.9 inch, as measured from the perimeter 173 of the striking plate portion 172 to the edge of the lower lateral section 178. In a preferred embodiment, the distance $d^s$ ranges from 0.2 inch to 3.0 inches, more preferably 0.50 inch to 2.0 inches, and most preferably 1.50 inch, as measured from the edge of the lower lateral section 178 to an apex 197 of the sole extension 195. In a preferred embodiment, the sole extension is triangular in shape with minor apices 199. In an alternative embodiment, not shown, the sole extension 195 has a crescent shape. In yet a further alternative, not shown, the sole extension 195 has a rectangular shape, and extends to the ribbon 190. Those skilled in the pertinent art will recognize that the sole extension 195 may have various shapes and sizes without departing from the scope and spirit of the present invention.

The sole portion 164 has a sole undercut 164a for placement under the return portion 174. The sole extension 195 is disposed within a sole undercut extension 164aa. The sole 164 and the lower lateral section 178, the heel lateral section 180 and the toe lateral section 182 are attached to each other as explained in greater detail below.

The aft-body 161 is preferably composed of a non-metal material, preferably a composite material such as continuous fiber pre-preg material (including thermosetting materials or a thermoplastic materials for the resin).

Such adhesives include thermosetting adhesives in a liquid or a film medium. A preferred adhesive is a two part liquid epoxy sold by 3M of Minneapolis Minn. under the brand names DP420NS and DP460NS. Other alternative adhesives include modified acrylic liquid adhesives such as DP810NS, also sold by the 3M company. Alternatively, foam tapes such as Hysol Synspan may be utilized with the present invention.

Figure 29:
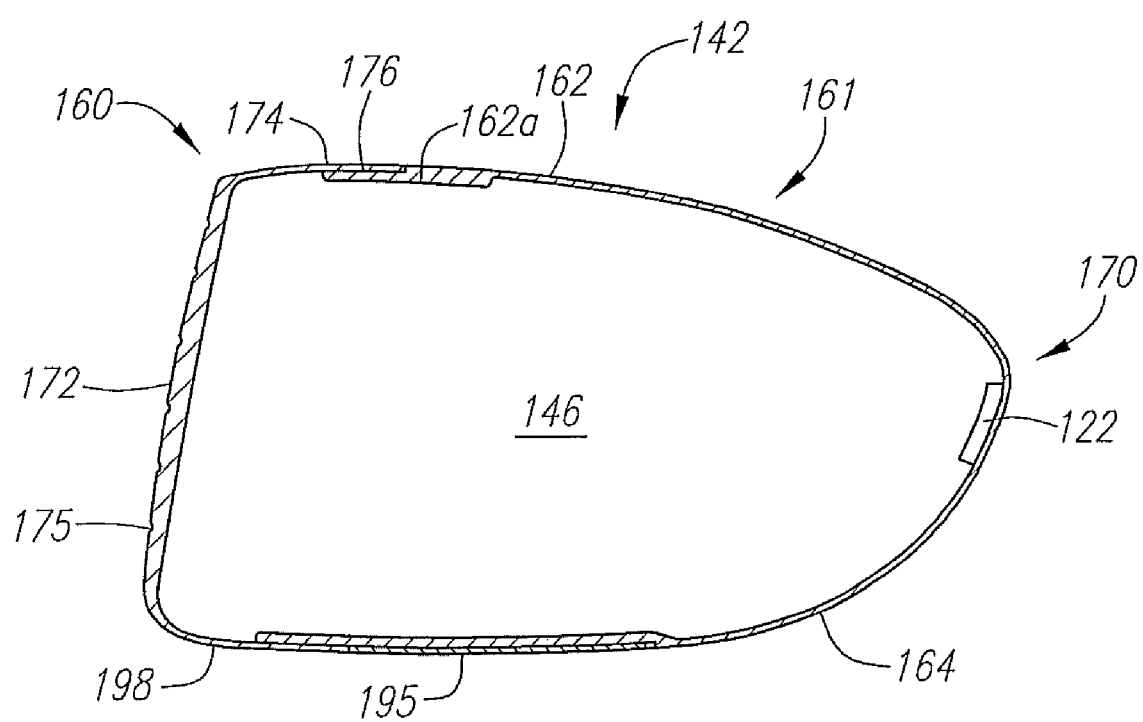
FIG. 29 is a cross-sectional view along line 27-27 of FIG. 27.

As shown in FIG. 29, the return portion 174 overlaps the undercut portions 162a and 164a a distance Lo, which preferably ranges from 0.25 inch to 1.00 inch, more preferably ranges from 0.40 inch to 0.70 inch, and is most preferably 0.50 inch. An annular gap 170 is created between an edge 190 of the crown portion 162 and the sole portion 164, and an edge 195 of the return portion 74. The annular gap 170 preferably has a distance Lg that preferably ranges from 0.020 inch to 0.100 inch, more preferably from 0.050 inch to 0.070 inch, and is most preferably 0.060 inch. A projection 175 from an upper surface of the undercut portions 62a and 64a establishes a minimum bond thickness between the interior surface of the return portion 74 and the upper surface of the undercut portions 162a and 164a. The bond thickness preferably ranges from 0.002 inch to 0.100 inch, more preferably ranges from 0.005 inch to 0.040 inch, and is most preferably 0.030 inch.

The crown portion 162 of the aft-body 161 is generally convex toward the sole 164, and engages the ribbon 190 of sole 164 outside of the engagement with the face member 160. The crown portion 162 preferably has a thickness in the range of 0.010 to 0.100 inch, more preferably in the range of 0.025 inch to 0.070 inch, even more preferably in the range of 0.028 inch to 0.040 inch, and most preferably has a thickness of 0.033 inch. The sole portion 164, including the bottom section 191 and the optional ribbon 190 which is substantially perpendicular to the bottom section 191, preferably has a thickness in the range of 0.010 to 0.100 inch, more preferably in the range of 0.025 inch to 0.070 inch, even more preferably in the range of 0.028 inch to 0.040 inch, and most preferably has a thickness of 0.033 inch. The undercut portions 162a, 164a, 64aa and 133a have a similar thickness to the sole portion 164 and the crown portion 162. In a preferred embodiment, the aft-body 161 is composed of a plurality of plies of pre-preg, typically six or seven plies, such as disclosed in U.S. Pat. No. 6,248,025, entitled Composite Golf Head And Method Of Manufacturing, which pertinent parts are hereby incorporated by reference.

A shaft is disposed within a hosel insert 121 that is disposed within the hosel 154. Such a hosel insert 121 and hosel 154 are described in U.S. Pat. No. 6,352,482, filed on Aug. 31, 2000, entitled Golf Club With Hosel Liner, which pertinent parts are hereby incorporated by reference. Further, the hosel 154 is preferably located rearward from the striking plate portion 172 in order to allow for compliance of the striking plate portion 172 during impact with a golf ball. In one embodiment, the hosel 54 is disposed 0.125 inch rearward from the striking plate portion 172.

Weighting members are preferably disposed within the hollow interior of the club head 142. In a preferred embodiment, the weighting members are disposed on the interior surface of the ribbon section 190 of the sole portion 164 in order to increase the moment of inertia and control the center of gravity of the golf club head 142. However, those skilled in the pertinent art will recognize that the weighting members may be placed in other locations of the club head 142 in order to influence the center of gravity, moment of inertia, or other inherent properties of the golf club head 142. The weighting members are preferably tungsten loaded film, tungsten doped polymers, or similar weighting mechanisms such as described in U.S. Pat. No. 6,386,990, filed on Dec. 29, 1999, entitled A Composite Golf Club Head With An Integral Weight Strip, and which pertinent parts are hereby incorporated by reference. Those skilled in the pertinent art will recognize that other high density materials may be utilized as an optional weighting member without departing from the scope and spirit of the present invention.

In a preferred embodiment, the weight members are three weighting components, which are embedded within the plies of pre-preg of the ribbon section 190 of the sole portion 164 of the aft-body 161. A heel weight component, a center weight component and a toe weight component are all disposed within the plies of pre-preg that compose the ribbon section 190 prior to the co-curing process. Individually, each of the weight components preferably has a mass ranging from 10 grams to 30 grams, preferably from 14 grams to 25 grams, and more preferably from 15 grams to 20 grams. Each of the weight components preferably has a density ranging from 5 grams per cubic centimeters to 20 grams per cubic centimeters, more preferably from 7 grams per cubic centimeters to 12 grams per cubic centimeters, and most preferably 8.0 grams per cubic centimeters.

Each of the weight components is preferably composed of a polymer material integrated with a metal material. The metal material is preferably selected from copper, tungsten, steel, aluminum, tin, silver, gold, platinum, or the like. A preferred metal is tungsten due to its high density. The polymer material is a thermoplastic or thermosetting polymer material. A preferred polymer material is polyurethane, epoxy, nylon, polyester, or similar materials. A most preferred polymer material is a thermoplastic polyurethane. A preferred weight component is an injection molded thermoplastic polyurethane integrated with tungsten to have a density of 8.0 grams per cubic centimeters. In a preferred embodiment, each of the weight components are composed of from 50 to 95 volume percent polyurethane and from 50 to 5 volume percent tungsten. Also, in a preferred embodiment, each of the weight components are composed of from 10 to 25 weight percent polyurethane and from 90 to 75 weight percent tungsten.

Preferably, the weight components extend from approximately the heel section 166 of the striking plate portion 172 through the rear section 170 to the toe section 168 of the striking plate portion 172. However, the weight components may only extend along the rear section 170 of the ribbon section 190, the heel section 166 of the ribbon section 190, the toe section 168 of the ribbon section 190, or any combination thereof. Also, the weight components may be positioned parallel to each other as opposed to being positioned in series. Those skilled in the pertinent art will recognize that other weighting materials may be utilized for the weight components without departing from the scope and spirit of the present invention. The placement of the weighting components allows for the moment of inertia of the golf club head 142 to be optimized.

The striking plate portion 172 is preferably partitioned into elliptical regions, each having a different thickness. In a preferred embodiment in which the face component 160 is composed of a titanium or titanium alloy material, a central elliptical region preferably has the greatest thickness that ranges from 0.120 inch to 0.090 inch, preferably from 0.115 inch to 0.100 inch, and is most preferably 0.105 inch. The central elliptical region preferably has a uniform thickness. A first concentric region preferably has the next greatest thickness that ranges from 0.110 inch to 0.076 inch, preferably from 0.100 inch to 0.086 inch, and is most preferably 0.088 inch. The first concentric region preferably has a thickness that transitions from the first concentric region thickness to the periphery region 110 thickness. A periphery region preferably has the next greatest thickness that ranges from 0.082 inch to 0.062 inch, and is most preferably 0.072 inch. The variation in the thickness of the striking plate portion 172 allows for the greatest thickness to be localized in the center of the striking plate portion 172 thereby maintaining the flexibility of the striking plate portion 172 which corresponds to less energy loss to a golf ball and a greater coefficient of restitution without reducing the durability of the striking plate portion 172.

As mentioned previously, the face component 160 is preferably forged from a rod of metal material. One preferred forging process for manufacturing the face component is set forth in U.S. Pat. No. 6,440,011, filed on Apr. 13, 2000, entitled Method For Processing A Striking Plate For A Golf Club Head, and hereby incorporated by reference in its entirety. Alternatively, the face component 160 is cast from molten metal in a method such as the well-known lost-wax casting method. The metal for forging or casting is preferably titanium or a titanium alloy such as 6-4 titanium alloy, alpha-beta titanium alloy or beta titanium alloy for forging, and 6-4 titanium for casting.

Additional methods for manufacturing the face component 160 include forming the face component 160 from a flat sheet of metal, super-plastic forming the face component 160 from a flat sheet of metal, machining the face component 160 from a solid block of metal, electrochemical milling the face from a forged pre-form, and like manufacturing methods. Yet further methods include diffusion bonding titanium sheets to yield a variable face thickness face and then superplastic forming.

Alternatively, the face component 160 is composed of an amorphous metal material such as disclosed in U.S. Pat. No. 6,471,604, which was filed on Apr. 4, 2002 and is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for manufacturing a multiple material golf club head, the method comprising:
 placing a metal face component into a face loft control piece and a face insert piece of a co-curing tool, the metal face component comprising a striking plate portion and a return portion, the metal face component having a return portion periphery;
 placing a gasket within a gasket groove of the face insert piece and also within a gasket groove of a gasket retaining piece;
 attaching the gasket retaining piece to the face insert piece;
 placing a sole pre-form of an aft-body pre-form in a sole piece of the co-curing tool and placing a crown pre-form of the aft-body within a crown piece of the co-curing tool with an inflatable bladder positioned within an interior of the aft-body pre-form, the aft-body pre-form composed of plies of pre-preg material;
 mating the components of the co-curing tool;
 heating the co-curing tool within a press at a temperature of at least 325° F. for a time period ranging from 10 minutes to 15 minutes;
 pressurizing the inflatable bladder to a pressure of at least 50 PSI; and
 removing a multiple material golf club head from the co-curing tool, the multiple material golf club head having a metal face component and an aft-body composed of a pre-preg material.

2. The method according to claim 1 wherein the inflatable bladder is pressurized from 50 PSI to 250 PSI.

* * * * *